United States Patent [19]

Coffee

[11] Patent Number: 4,705,067
[45] Date of Patent: Nov. 10, 1987

[54] ELECTRIC-TO-PRESSURE TRANSDUCER

[76] Inventor: Curtis L. Coffee, 2815 Plaza Dr., Apt. A, Indianapolis, Ind. 46268

[21] Appl. No.: 862,760

[22] Filed: May 13, 1986

[51] Int. Cl.⁴ .......................................... G05D 10/00
[52] U.S. Cl. ............................. 137/487.5; 251/129.04
[58] Field of Search ........................... 137/487.5, 486; 251/129.04

[56] References Cited

U.S. PATENT DOCUMENTS

| | | |
|---|---|---|
| 3,005,462 | 10/1961 | Hillman et al. |
| 3,201,042 | 8/1965 | Norman et al. |
| 3,244,190 | 4/1966 | Taylor . |
| 3,856,034 | 12/1974 | Itoh . |
| 3,877,477 | 4/1975 | Bader . |
| 4,253,480 | 3/1981 | Kessel et al. . |
| 4,394,871 | 7/1983 | Czajka ........................ 137/487.5 X |
| 4,481,967 | 11/1984 | Frick . |
| 4,509,547 | 4/1985 | Smith ......................... 137/487.5 X |
| 4,573,114 | 2/1986 | Ferguson .................... 137/487.5 X |

OTHER PUBLICATIONS

Specification sheet, Johnson Controls, Models N-6810 and N-6820 Electropneumatic Transducer (undated).
Specification sheet, Fairchild Industrial Products Co., Models T5000-03, T5000-04 and T5000-09 Electromagnetic Transducers, (undated).
Specification sheet, Barber Colman Company, Models CP-8551 and CP-8561, Electronic-pneumatic Transducers, 8-83.
Specification sheet, Robertshaw, Model 2899-040 Electric-Pneumatic Transducer, (undated).
Specification sheet, Kele & Associates, Model ME-P-018 Electronic/Pneumatic Transducer, (undated).

Primary Examiner—Alan Cohan
Attorney, Agent, or Firm—Woodard, Emhardt, Naughton, Moriarty & McNett

[57] ABSTRACT

A linear, closed-loop current-to-pressure transducer operating with a two-way solenoid valve. Outlet fluid pressure feedback is provided by an integral-circuit pressure sensor having a direct, sealed connection to a manifold to which the solenoid valve is also directly connected, the pressure sensor being electrically connected to the feedback input of a servo amplifier which has a reference input connected to an analog control signal input through an input scaling circuit capable of adjusting both span and offset. The input scaling circuit, servo amplifier, pressure sensor, and manifold, which includes a feedback line from the solenoid valve to the pressure sensor, are mounted on a printed-circuit board.

11 Claims, 6 Drawing Figures

ELECTRIC-TO-PRESSURE TRANSDUCER

BACKGROUND OF THE INVENTION

The present invention relates to electric-to-pressure transducers, and particularly to electric-to-pressure transducers employing a feedback loop to control fluid pressure.

Electric-to-pressure transducers convert an electric signal to a pressure signal which may be used for control of remote pneumatic or hydraulic devices such as pilot-actuated valves. Such transducers are commercially available in many forms, one of which is a current-to-pressure transducer which converts an input signal of 4–20 milliamperes (ma) DC into a proportional pneumatic gauge pressure of 3–15 pounds per square inch (psig). This type of transducer is available from Johnson Controls (Model N-6810), Fairchild Industrial Products Co., Winston-Salem, N.C. (Model T5000-04), and Barber Colman (Model CP-8551 and CP-8561) as an open-loop device. Closed-loop control is possible with the Robertshaw Model 2899-040 transducer, a motorized transducer with a potentiometer coupled to the motor shaft for indicating shaft position to an external controller.

U.S. Pat. No. 4,481,967 to Frick discloses a two-wire 4–20 ma current-to-pressure converter utilizing pressure feedback. Capacitive and piezoresistive pressure transducers are disclosed, and linear control is achieved using a servo valve. While a servo valve enables linear pressure control, it is an expensive device, particularly in comparison to a standard on-off valve such as a solenoid valve.

Solenoid valves are widely viewed as unsuitable for precision applications, particularly for any application requiring linear control, because the magnetic field within a solenoid produces a continuous mechanical force on the solenoid plunger which tends to drive the plunger to an extreme end position. Open-loop pressure control is further impractical with a standard on-off valve because electrical control of valve element position is not repeatable in many working environments due to external factors such as vibration.

A solenoid valve is used in the closed-loop pressure regulator of U.S. Pat. No. 4,253,480 to Kessel et al. for producing a continuously variable opening, but a relatively complex pulse-width modulating scheme is employed to achieve the desired variations in valve position.

Existing electric-to-pressure transducers such as those described above have one or more disadvantages including inaccuracy, nonlinearity, complex mechanical construction or electrical circuitry, high cost, excessive size, and sensitivity to vibration or other environmental conditions.

SUMMARY OF THE INVENTION

The present invention provides a linear electric-to-pressure transducer operating with a two-way solenoid valve. A command signal supplied to the transducer is scaled and supplied as a reference signal to a servo amplifier which determines the difference between the reference signal and a feedback signal which is a function of the outlet pressure of the transducer. The servo amplifier supplies a corresponding error signal to the solenoid valve for control thereof.

According to another aspect of the invention, a complete, closed-loop, electric-to-pressure transducer is provided on an electrically insulating substrate. A two-way solenoid valve is mounted on a manifold which is mounted on the substrate, and the pressure in an outlet fluid line of the manifold is sensed by a miniature pressure sensor having a pressure port directly sealingly engaging the outlet fluid line. An electrical output of the pressure sensor is first amplified by a feedback amplifier and then supplied to a feedback input of a forward amplifier which also has a reference input connected to an input scaling circuit for scaling an electrical command signal input. The output of the forward amplifier is connected to the solenoid in the solenoid valve for control thereof.

A general object of the present invention is to provide an improved electric-to-pressure transducer.

Another object of the invention is to enable linear, closed-loop control using a standard on-off valve without sacrificing circuit simplicity.

Yet another object is to provide a compact, accurate electric-to-pressure transducer having reduced sensitivity to extraneous environmental conditions such as vibration and which is relatively inexpensive and simple to assemble.

These and other objects and advantages of the present invention will be more apparent from the following detailed description of the preferred embodiment when taken in conjunction with the accompanying drawings.

DESCRIPTION OF THE PREFERRED EMBODIMENT

Figure 1:
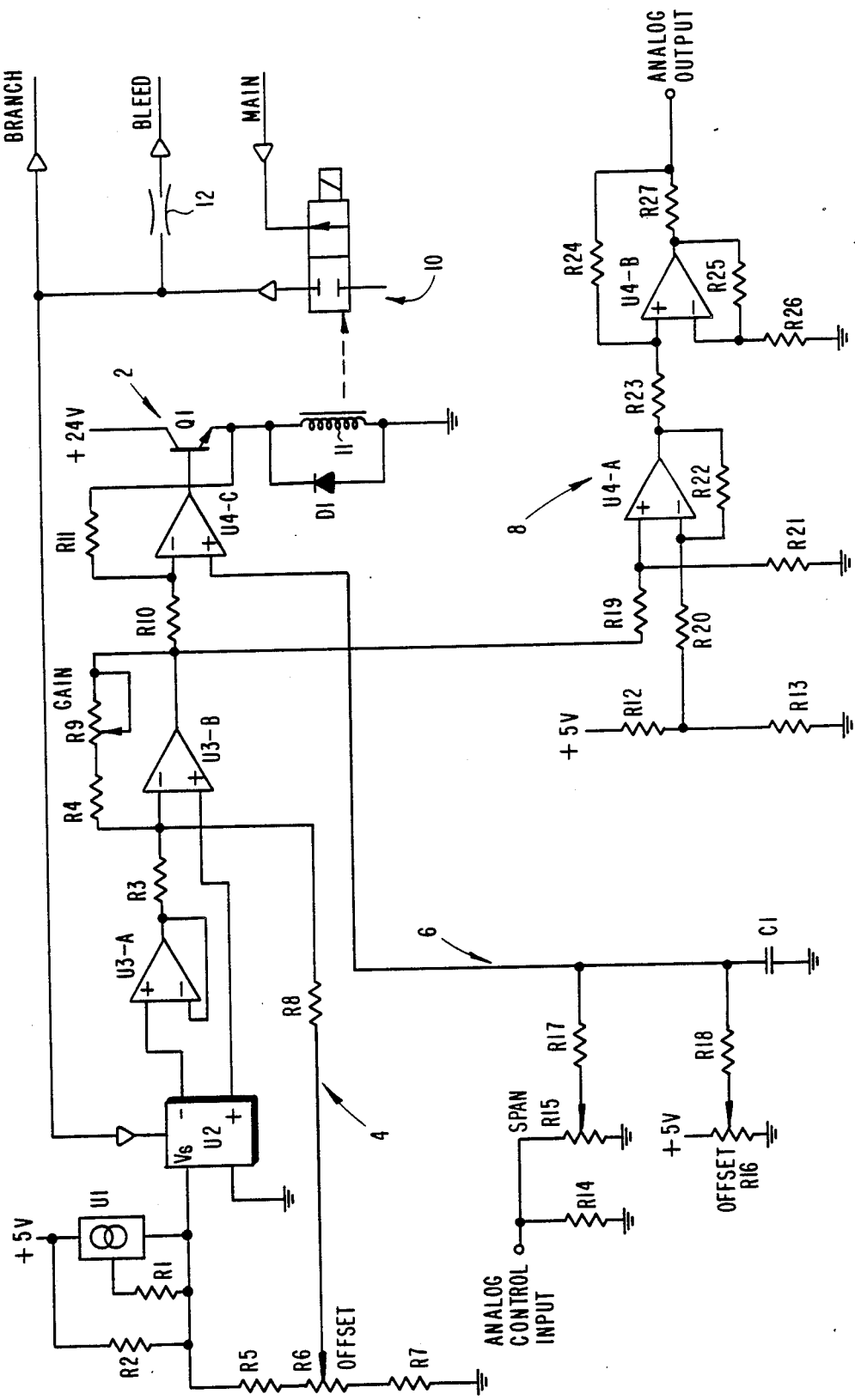
FIG. 1 is a combined electrical and pneumatic schematic drawing of the preferred embodiment of an electric-to-pressure transducer according to the present invention.

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

With reference to FIG. 1, the preferred embodiment of the electric-to-pressure transducer of the present invention includes a closed-loop pressure control system which converts an analog 4–20 ma signal to a proportional pneumatic pressure signal of 3–15 psig in a branch air line which, in use, is connected to an air-actuated device responsive to actuation pressures in the 3–15 psig range. The closed loop includes a forward path consisting of error amplifier 2 and a standard on-off valve 10 having an input from a main air line and an output to the branch line. Valve 10 is preferably a Model AM-090-1-24 normally-closed, micro-miniature solenoid valve commercially available from Angar Scientific Co., Inc., 52 Horsehill Rd., Cedar Knolls, N.J. 07927. A bleed line is also connected to the output of valve 10 through a fixed restrictor 12. Restrictor 12 is preferably a 0.005" fixed-orifice restrictor, Model F-2815-050 sold by Air Logic Division of Fred Knapp Engraving Company, 5102 Douglas Avenue, Racine, Wis. 53402. The feedback path of the loop includes a pressure transducer 4 composed of pressure sensor U2, operational amplifiers (op amps) U3-A and U3-B, and the associated circuitry shown in FIG. 1. The illustrated current-to-pressure transducer includes an input scaling circuit 6 having a resistor 14 (R14) which establishes the input impedance for the transducer, and a potentiometer R15 which, through variable attenuation, sets the span of the transducer. Span is the arithmetic difference between the maximum and minimum operating pressures, which correspond to the two extreme settings of span pot R15. A second potentiometer R16 provides offset adjustment. That is, it determines the offset pressure for the current-to-pressure transducer, namely, the branch line pressure for an analog control input of zero volts. The outputs from R15 and R16 are combined in a summing network consisting of R17, R18, and capacitor C1 to produce a reference signal which is then supplied to the noninverting input of error amplifier U4-C to set the reference level for the closed loop and, through the response of the loop, to determine the output pressure in the branch line. Input scaling circuit 6 provides significant advantages by permitting variation of both span and offset.

Error amplifier 2 is provided with an output driver transistor Q1 connected to the output of op amp U4-C to provide increased current supply to the solenoid coil 11 in valve 10. Q1 is configured as a voltage follower and therefore does not significantly affect the error amplifier voltage gain, which is determined essentially by the ratio of R11 to R10. A commutating diode D1 is connected across solenoid coil 11 with the diode anode connected to ground. An error signal is generated at the emitter of Q1 which is proportional to the difference between the scaled analog control signal and the feedback signal from U3-B which is coupled through R10 to the inverting input of op amp U4-C. The error amplifier is thus capable of varying the voltage across the solenoid coil 11 linearly over a range of approximately 24 volts. The solenoid coil current varies accordingly and consequently causes variations in the position of the valve element in solenoid valve 10.

As the valve opens, the branch line pressure increases in response to the supply of air through the valve from the main line, and, conversely, as the valve closes, the pressure in the branch line decreases. Fixed restrictor 12 provides a constant bleed to atmosphere from the output of valve 10 and thereby enables branch line pressure to decrease when necessary. With the constant bleed rate and the variable orifice provided by valve 10, a pilot pressure can be maintained in the branch line. Pressure is controlled by the closed loop with the aid of a pressure sensor U2 having a pressure port connected in communication with the branch line. U2 is an SPX200DN integrated-circuit (IC) pressure sensor commercially available from Sensym, 1255 Reamwood Avenue, Sunnyvale, Calif. 94089. Pressure sensor U2 functions as a Wheatstone bridge, with the resistance in the arms of the bridge changing as a function of the pressure applied to the device so as to produce an output voltage proportional to pressure and to the bridge input voltage, which is set by a constant-current source U1 and a resistor R2 connected between +5 volts and the $V_S$ inut of U2. Temperature compensation is provided for pressure sensor U2 by the combined action of R2 and U1, which is a National Semiconductor LM334Z adjustable current source the output current of which is set by R1. In the preferred embodiment R1 has a value of 16.9 ohms and R2 has a value of 196 ohms. The bridge output of U2 is connected to amplifier U3 which includes op amps U3-A and U3-B as shown in FIG. 1. U3 is an ICL7621 DCPA single-supply CMOS op amp commercially available from GE Intersil, and it is powered from a source of +5 VDC (not shown). U3-A is configured as a voltage follower and U3-B is configured as a variable-gain amplifier having a minimum gain of approximately 50 and maximum gain of approximately 150. Error amplifier 2 preferably has a fixed gain of approximately 100.

The feedback circuit includes an offset adjusting circuit consisting of R5 and R7 and offset pot R6 coupled to the inverting input of op amp U3-B through R8. The offset adjusting circuit, which is supplied with the same supply voltage as the bridge in U2, is provided to correct for the offset voltage of the pressure sensor IC, which varies from part to part.

In operation, a command signal corresponding to a desired branch line pressure is supplied to the analog control input and is scaled by input scaling circuit 6, which supplies a corresponding reference signal to error amplifier U4-C. If the command signal corresponds to a different pressure than the current pressure in the branch line, U4-C generates an error signal which drives solenoid valve 10 so as to increase or decrease the pressure in the branch line, as necessary. Pressure sensor U2 provides an output voltage directly proportional to the applied pressure, and feedback amplifier U3 amplifies the output voltage and supplies it to U4-C for comparison with the reference level supplied from the input scaling circuit. Device polarities are selected, in conventional fashion, so as to provide negative feedback, i.e., to produce an error signal which causes the pressure in the branch line to increase when lower than the selected command pressure and to decrease when higher than the selected command pressure.

The feedback signal at the output of U3-B is also supplied as an external analog output through buffer amplifier 8, which includes two op amps U4-A and U4-B each configured as a noninverting amplifier of approximately unity gain. U4-B functions as a voltage-to-current converter, with nominal current gain set by R27. For the output current range of 4–20 ma, R27 preferably has a value of 187 ohms. U4 is preferably a National Semiconductor LM324N quad op amp powered from a single supply of +24 VDC. The buffer amplifier additionally includes offset adjusting resistors R12 and R13 which are selected to provide an offset of 4 ma at the analog output.

The current-to-pressure transducer operates from a single supply of approximately +24 VDC, and accordingly includes a regulated power supply (not shown) for generating +5 VDC. A National Semiconductor 78L05 5-volt IC regulator is suitable for this purpose. The transducer power supply also includes a diode protection circuit (not shown) at its input to protect the electronic circuitry from connection to a voltage supply of improper polarity.

Figure 2:
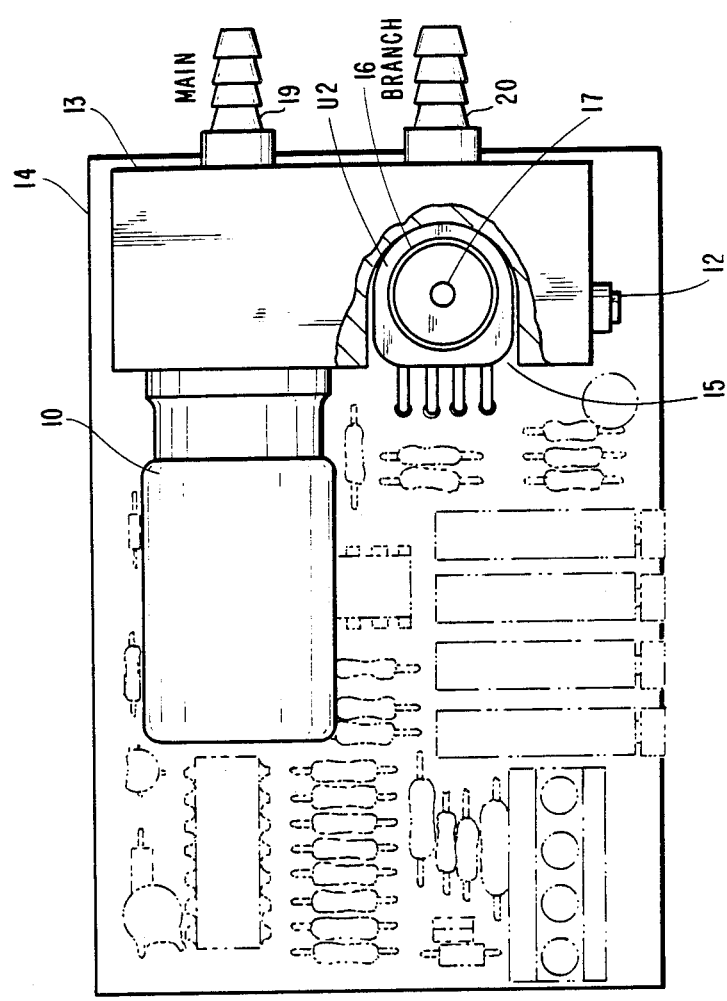
FIG. 2 illustrates the printed-circuit board mounting of the preferred embodiment shown in FIG. 1.

With reference to FIG. 2, in the preferred embodiment of the present invention valve 10 and restrictor 12 are mounted in a manifold 13 which in turn is mounted on a printed-circuit board 14 along with all the electronic circuitry shown in FIG. 1 as well as the power supply for same. Manifold 13 is fastened to circuit board 14 by two screws (not shown) passing through respective holes in the circuit board and into threaded holes provided in the bottom of manifold 13 for this purpose. Pressure sensor U2 is mounted horizontally on printed-circuit board 14 with its four leads soldered thereto, and manifold 13 is mounted on the board over sensor U2 in a position so as to contain U2 in a chamber 15 provided in the bottom of the manifold for this purpose. Chamber 15 conforms generally to the shape of U2 but is slightly larger in size so as to exert a clamping force on U2 through an O-ring 16 placed around the pressure port 17 in sensor U2. The O-ring provides a seal between the pressure sensor and manifold to permit communication of air pressure to pressure port 17 from a passageway in the manifold which is illustrated in FIG. 3. Barbed fittings 19 and 20 provide tubing connection points to the main line input and branch line output of the manifold and current-to-pressure transducer.

Figure 3C:
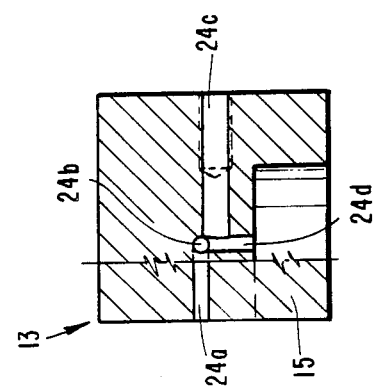
FIG. 3C is a sectional view along lines 3C in FIG. 3A.
Figure 3A:
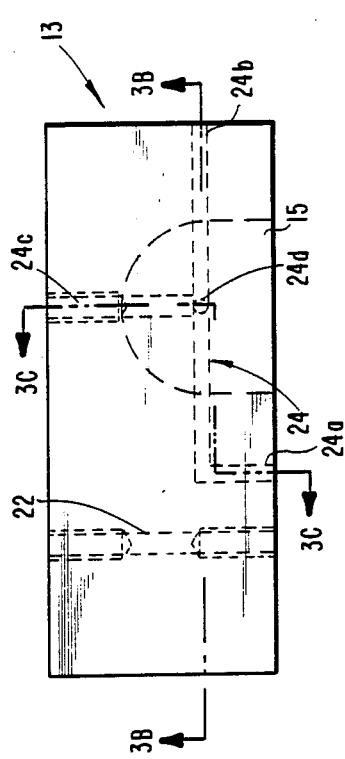
FIG. 3A is a top plan view of the manifold illustrated in FIG. 2.
Figure 3B:
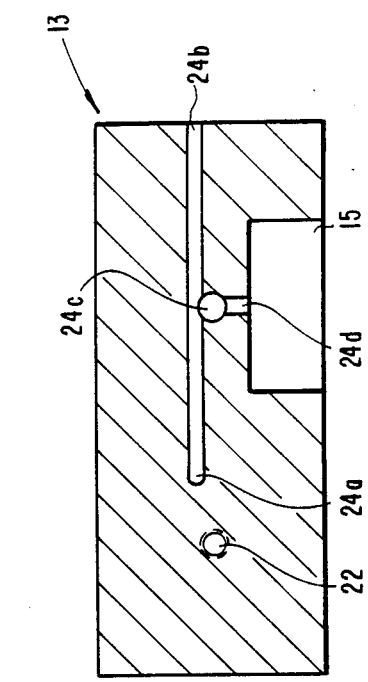
FIG. 3B is a sectional view along lines 3B in FIG. 3A.

The internal structure of manifold 13, illustrated in FIGS. 3A-3C, includes two passageways 22 and 24 which function as fluid lines interconnecting the various devices fastened to the manifold. Passageway 22 is a straight through-hole having both ends threaded to receive main line fitting 19 in the rear, and one port of solenoid valve 10 in the front, of manifold 13. Passageway 24 has three horizontal channels 24a, 24b, and 24c, and one vertical channel 24d. Channel 24a provides a fluid line connection to a second port of solenoid valve 10, channel 24b provides a similar connection to restrictor 12, channel 24c provides a similar connection to branch line fitting 20, and channel 24d provides a similar connection to chamber 15 and therethrough to pressure sensor U2. The outside end of channel 24c is threaded to receive the branch line fitting. Pressure feedback is provided completely internally in the manifold via channels 24a, 24b, and 24d which interconnect valve 10 and pressure sensor U2. The novel combination of elements described above results in a highly compact, easily assembled unit. In the preferred embodiment shown in FIG. 2, the manifold is approximately 1.8" long by 0.75" wide by 0.75" high, and the printed-circuit board is approximately $3\frac{1}{8}$" long by $2\frac{1}{8}$" wide.

The current-to-pressure transducer described above may be connected to a controlled device through a direct pneumatic line or may be connected through a volume booster, such as a Robertshaw Model R432-11 low-pressure selector relay. Also, the transducer may be modified for operation as a voltage-to-pressure transducer by removal of R14 and supply of appropriate voltage levels directly to span pot R15. One such voltage-to-pressure transducer which is presently contemplated accepts 3-15 volts as an input and generates a corresponding output of 3-15 psig. In another alternative embodiment, a gauge port is provided in manifold 13 for connection of a gauge directly to the transducer rather than in line with the load on the branch line. The gauge port is preferably on the top of the manifold directly above the center of passageway 22, and a vertical passageway is provided to passageway 22 from the gauge port, which is internally threaded for screw-mounting of a gauge.

Experiments have shown that the transducer exhibits fast yet stable response with the loop gain set as described above and with a small amount of damping in the branch line. Sufficient damping is provided by the typical external load on the branch line, i.e., a device controlled by the transducer and connected thereto by flexible plastic tubing. For very short lengths of tubing, such as 1-2 inches, connected to some controlled devices, it may be necessary to decrease the transducer loop gain, such as by reducing the value of R11, to maintain adequate stability.

Figure 4:
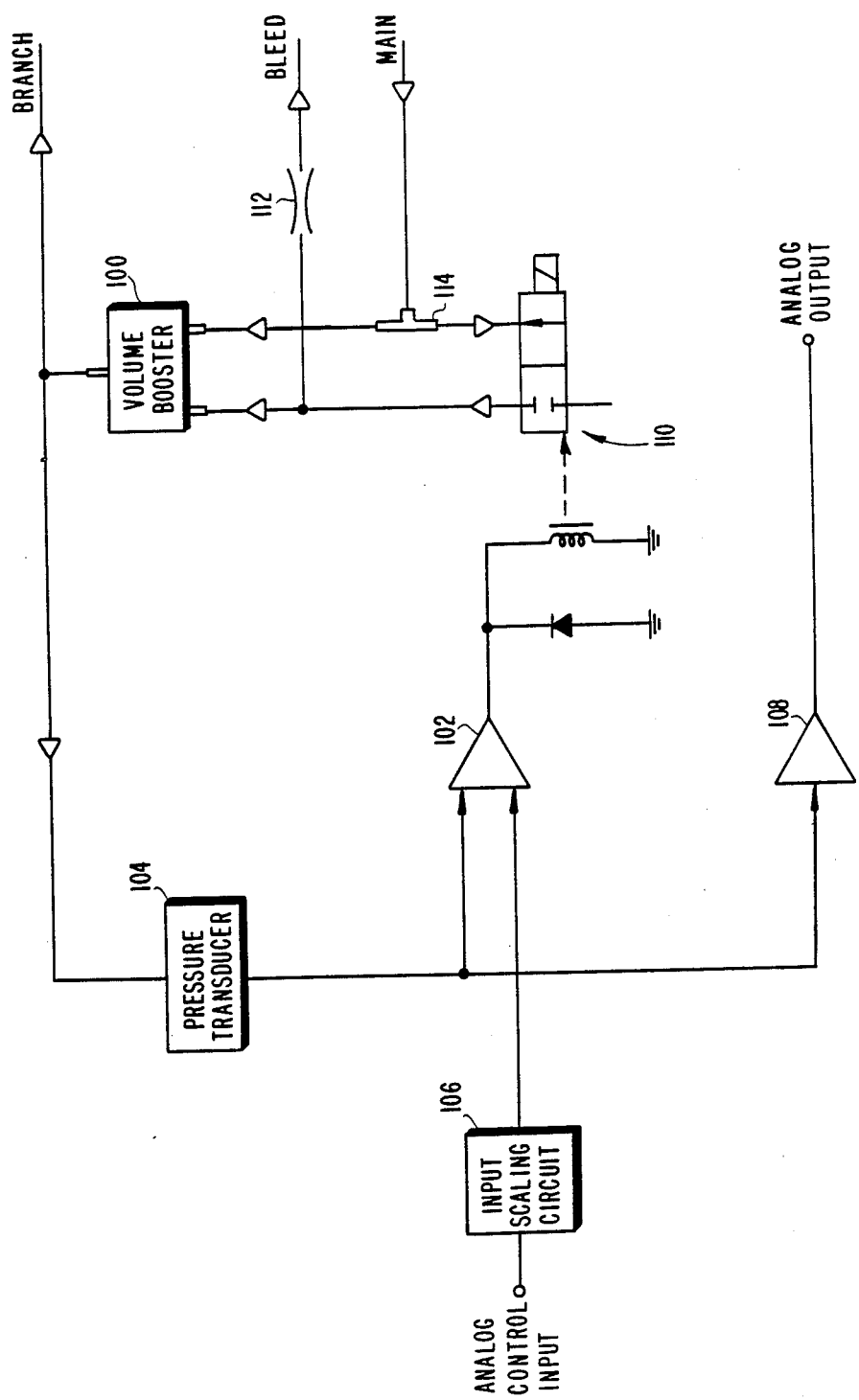
FIG. 4 shows a combined electrical and pneumatic schematic drawing of an alternative embodiment of the present invention.

In another alternative embodiment of the present invention, shown in FIG. 4, the feedback loop is closed around a volume booster 100 for control of pressure in the branch line. The preferred volume booster is the Robertshaw Model R432-11 mentioned above. The control loop includes an error amplifier 102 and a pressure transducer 104 which, like solenoid valve 110, are identical to their respective counterparts in the embodiment shown in FIG. 1, except for a possible difference in the gain of amplifier 102 to maintain loop stability, as will be appreciated by those skilled in the art. Similarly, input scaling circuit 6 shown in FIG. 1 is used for the input scaling circuit 106 of FIG. 4, and buffer amplifier 8 of FIG. 1 is used for the amplifier 108 of FIG. 4. Further, in this embodiment restrictor 112 is preferably the same size as restrictor 12 of the embodiment shown in FIG. 1.

Main line air pressure is supplied to both valve 110 and volume booster 100 through a tee 114 in the pneumatic line. The solenoid valve is connected to the restrictor, as before, but is supplied to an input of volume booster 100 instead of directly to the branch line. The manifold shown in FIGS. 2 and 3 is not used with the embodiment of FIG. 4.

Although the feedback signal has been described above as a pressure feedback signal, a variety of alternative forms of feedback could be employed in the valve control system described herein, such as feedback signals based on temperature, humidity, light level, or liquid level. As one example of a control system employing one of these alternative feedback signals, a heating, ventilating and air conditioning (HVAC) system, which is conventionally controlled on the basis of temperature, may be arranged with its main hot air or cool air lines controlled by an air-actuated control element which is in turn controlled by solenoid valve 10 as a pilot valve. Also, it should be understood that, although the invention has been described with respect to a pneumatic system, the system is equally operable in systems using fluids other than air, such as hydraulic fluid or water.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

I claim:

1. A linear electric-to-pressure transducer, comprising:
   a printed-circuit board substrate;
   a manifold mounted on said substrate, said manifold defining inlet and outlet fluid lines, said inlet fluid line having a first terminating port for connection to a fluid source and further having a second terminating port, said outlet fluid line having a third terminating port for connection to an output device and further having fourth, fifth and sixth terminating ports;

a two-way solenoid valve mounted on said manifold, said valve including first and second ports directly sealingly engaging said second and fourth terminating ports, respectively, in said manifold;

a restrictor having one end sealingly engaged in said fifth terminating port in said manifold; and closed-loop control means for operating said two-way solenoid valve as a linear variable orifice, said control means including a miniature pressure sensor, said pressure sensor having a pressure port directly sealingly engaging said sixth terminating port in said manifold, said pressure sensor further including an electrical output;

input scaling means mounted on said substrate for scaling an electrical command signal;

a forward amplifier mounted on said substrate, said forward amplifier having a reference input connected to said input scaling means, an output connected to the solenoid in said solenoid valve, and further including a feedback input; and a feedback amplifier mounted on said substrate and connected between said pressure sensor electrical output and said feedback input of said forward amplifier, said input scaling means, forward amplifier and feedback amplifier each including a printed circuit portion on said substrate.

2. The electric-to-pressure transducer of claim 1 wherein said pressure sensor is an integrated-circuit pressure sensor.

3. The electric-to-pressure transducer of claim 2 wherein said input scaling means includes means for adjusting span and offset.

4. The electric-to-pressure transducer of claim 3 wherein said manifold defines a bottom chamber having an upper surface in communication with said outlet fluid line; and wherein said manifold is mounted on said printed-circuit board with said chamber over said pressure port of said integrated-circuit pressure sensor and in sealed fluid communication therewith.

5. The electric-to-pressure transducer of claim 4 further comprising a buffer amplifier mounted on said substrate and connected to an output of said feedback amplifier.

6. The electric-to-pressure transducer of claim 5 wherein said substrate has a surface area of less than 10 square inches.

7. The electric-to-pressure transducer of claim 1 wherein said substrate has a surface area of less than 10 square inches.

8. A linear electric-to-pressure transducer, comprising:

a two-way solenoid valve; and closed-loop control means for operating said two-way solenoid valve as a linear variable orifice, said closed-loop control means including proportional control means for controlling said solenoid valve with a control signal directly proportional to the difference between a reference signal and a feedback signal, said proportional control means including a DC-coupled servo amplifier having an output connected directly to the solenoid in said solenoid valve and including first and second inputs;

input scaling means for scaling a command signal to produce a reference signal, said scaling means including means for supplying said reference signal to said first input of said servo amplifier;

a pressure transducer having a pressure port and means for generating a feedback signal proportional to pressure applied to said pressure port, said output signal generating means being connected electrically to said second input of said servo amplifier;

a first fluid line connected between a first port of said valve and said pressure port of said pressure transducer;

an inlet port;

an outlet port;

a second fluid line connected between said inlet port and a second port of said valve;

wherein said first fluid line is further connected to said outlet port, and wherein said pressure transducer includes an integrated-circuit pressure sensor;

wherein said input scaling means includes means for adjusting span and offset;

a printed-circuit board having said servo amplifier, said input scaling means and said pressure transducer mounted thereon;

a manifold mounted on said printed-circuit board, said manifold defining said first and second fluid lines; and means for securing said valve and said integrated-circuit pressure sensor to said manifold with said first port of said valve and said pressure port of said integrated-circuit pressure sensor in sealed fluid communication with said first fluid line, and with said second port of said valve in sealed fluid communication with said second fluid line.

9. A linear electric-to-pressure transducer, comprising:

a two-way solenoid valve; and closed-loop control means for operating said two-way solenoid valve as a linear variable orifice, said closed-loop control means including proportional control means for controlling said solenoid valve with a control signal directly proportional to the difference between a reference signal and a feedback signal, said proportional control means including a DC-couped servo amplifier having an output connected directly to the solenoid in said solenoid valve and including first and second inputs;

input scaling means for scaling a command signal to produce a reference signal, said scaling means including means for supplying said reference signal to said first input of said servo amplifier:

a pressure transducer having a pressure port and means for generating a feedback signal proportional to pressure applied to said pressure port, said output signal generating means being connected electrically to said second input of said servo amplifier; and a first fluid line connected between a first port of said valve and said pressure port of said pressure transducer;

a printed-circuit board having said servo amplifier, said input scaling means and said pressure transducer mounted thereon;

a manifold mounted on said printed-circuit board, said manifold defining said first fluid line and further defining a second fluid line; and means for securing said valve and said integrated-circuit pressure sensor to said manifold with said first port of said valve and said pressure port of said integrated-circuit pressure sensor in sealed fluid communication with said first fluid line, and with a second port of said valve in sealed fluid communication with said second fluid line; and bleed port means for bleeding fluid from said first fluid line, said bleed port means including a restrictor.

10. The electric-to-pressure transducer of claim 8 wherein said manifold defines a bottom chamber having an upper surface in communication with said first fluid line, and wherein said manifold is mounted on said printed-circuit board with said chamber over said pressure port of said integrated-circuit pressure sensor and in sealed fluid communication therewith.

11. The electric-to-pressure transducer of claim 10 wherein said output signal generating means in said pressure transducer includes a voltage amplifier connected to an output of said integrated-circuit pressure sensor, said electric-to-pressure transducer further comprising an analog signal output terminal connected to an output of said voltage amplifier.

* * * * *